US008140378B2

(12) United States Patent
Sorensen (10) Patent No.: US 8,140,378 B2
(45) Date of Patent: *Mar. 20, 2012

(54) SYSTEM AND METHOD FOR MODELING SHOPPING BEHAVIOR (75) Inventor: Herb Sorensen, Corbett, OR (US)

(73) Assignee: Shopper Scientist, LLC, Corbett, OR (US)

(*) Notice: Subject to any disclaimer, the term of this patent is extended or adjusted under 35 U.S.C. 154(b) by 1415 days.

This patent is subject to a terminal disclaimer.

(21) Appl. No.: 11/179,306

(22) Filed: Jul. 11, 2005

(65) Prior Publication Data
US 2006/0010030 A1    Jan. 12, 2006

Related U.S. Application Data (60) Provisional application No. 60/586,792, filed on Jul. 9, 2004.

(51) Int. Cl.
G06Q 30/00    (2006.01)
(52) U.S. Cl. ..................... 705/7.31; 705/7.29
(58) Field of Classification Search ............... 705/7.29, 705/7.31
See application file for complete search history.

(56) References Cited

U.S. PATENT DOCUMENTS

| 5,287,266 | A | | 2/1994 | Malec et al. |
| 5,305,197 | A | | 4/1994 | Axler et al. |
| 5,541,835 | A | | 7/1996 | Dextraze et al. |
| 5,630,068 | A | * | 5/1997 | Vela et al. ............. 705/323 |
| 5,821,513 | A | | 10/1998 | O'Hagan et al. |
| 5,910,769 | A | | 6/1999 | Geisler |
| 5,918,211 | A | | 6/1999 | Sloane |
| 5,974,396 | A | | 10/1999 | Anderson et al. |
| 6,011,487 | A | | 1/2000 | Plocher |
| 6,112,988 | A | | 9/2000 | Powell |
| 6,317,718 | B1 | | 11/2001 | Fano |
| 6,381,583 | B1 | | 4/2002 | Kenny |
| 6,388,688 | B1 | | 5/2002 | Schileru-Key |
| 6,421,080 | B1 | | 7/2002 | Lambert |
| 6,659,344 | B2 | | 12/2003 | Otto et al. |
| 6,820,062 | B1 | | 11/2004 | Gupta et al. |
| 6,836,773 | B2 | | 12/2004 | Tamayo et al. |

(Continued)

FOREIGN PATENT DOCUMENTS

JP    2001-331875 A    5/2000

(Continued)

OTHER PUBLICATIONS

Farley and Ring, A Stochastic Model of Supermarket Traffic Flow, Operations Research, vol. 14, No. 4, Jul.-Aug. 1966, p. 566-67.*

(Continued)

Primary Examiner — Justin M Pats
(74) Attorney, Agent, or Firm — Alleman Hall McCoy Russell & Tuttle LLP (57) ABSTRACT A system and method are provided for modeling shopper behavior in a store. The system may include an analysis program executable on a computing device, configured to receive product position data and shopper path data gathered from a plurality of stores, each having a different shape represented in a corresponding store map. The analysis program is typically configured to spatially define behavioral domains, product categories, and geographic locations that are common to each of the store maps, and compute statistics based on the product position data and the shopper path data, which statistics are normalized by behavioral domain, product category, and geographic location, across the plurality of stores.

14 Claims, 11 Drawing Sheets

U.S. PATENT DOCUMENTS

| | | | |
|---|---|---|---|
| 7,006,982 B2* | 2/2006 | Sorensen | 705/7.29 |
| 7,475,813 B2* | 1/2009 | Swanson, Sr. | 235/383 |
| 2002/0062245 A1 | 5/2002 | Niu et al. | |
| 2002/0161651 A1* | 10/2002 | Godsey et al. | 705/22 |
| 2002/0178085 A1* | 11/2002 | Sorensen | 705/26 |
| 2003/0039379 A1 | 2/2003 | Gutta et al. | |
| 2006/0010027 A1* | 1/2006 | Redman | 705/10 |

FOREIGN PATENT DOCUMENTS

| | | |
|---|---|---|
| JP | 2003-016243 A | 7/2001 |
| WO | WO 99/14694 | 3/1999 |

OTHER PUBLICATIONS

Heller, Tracking Shoppers Through the Combination Store, Progressive Grocer, Nov. 1988, p. 47-64 (pdf pp. 47-51, 54, 56, 58, 62, and 64).*

Envirosell, envirosell.com, 2001, retrieved from web.archive.org, p. 1-48.*

Underhill, Why We Buy—The Science of Shopping, Obat, 1999, 256 pages (pdf pp. 7-8, 11-14, 18-21, 26-30, 34-37, 44, 75-82).* www.premiercarts.com—Shopping cart manufacturer web site archived on Aug. 17, 2000, web.archive.org, 1 Pg.

Srivastava, Jaideep, et al., "Web Usage Mining: Discovery and Applications of Usage Patterns for Web Data", ACM SIGKDD Explorations, Jan. 2000, 12 pgs.

Zaiane, Osmar, et al., "Discovering Weg Access Patterns and Trends by Applying OLAP and Data Mining Technology on Web Logs", 11 Pgs.

Peacock, Peter, "Data Mining in Marketing: Part 1", Marketing Management, Winter 1998. vol. 6, No. 4, 11 Pgs.

Greening, Dan R., "Tracking Users", Web Techniques, Jul. 1999, vol. 4, No. 7, 6 Pgs.

Underhill, Paco, "Why We Buy: The Science of Shopping", Simon & Schuster 1999, ISBN: 0-684-84913-5, 31 Pgs.

Envirosell.com—Research Report, Sample Retail Report, Articles about Envirosell web pages 1999-2000, Retreived Apr. 6, 2005 from WebArchive.org, 14 Pgs.

Gaynor, Mark, "Hidden Camera Reveal Human Side of P-O-P Story", P-O-P Times, 1999, Retreived Apr. 6, 2005, WebArchive.org, 6 Pgs.

Hammonds, Keith, "How We Sell", Fast Company, Nov. 1999, 9 Pgs.

* cited by examiner

☐ OPEN AREA  ☒ CENTER  ☒ CHECKOUT
☒ SERVICE  ☒ END CAP

BAAZAR (B) 84%   CONSTRAINED LONG (CL) 75%   CONSTRAINED SHORT (CS) 40%
END CAPS (E) 88%   REMAINDER (R) 65%   SERVICE (S) 83%   CHECKOUT (CO) 85%

Fig. 9

BAZAAR (B) 49%   CONSTRAINED LONG (CL) 52%   CONSTRAINED SHORT (CS) 42%
END CAPS (E) 63%   REMAINDER (R) 73%   SERVICE (S) 45%   CHECKOUT (CO) 88%

United States Patent US 8,140,378 B2

SYSTEM AND METHOD FOR MODELING SHOPPING BEHAVIOR

CROSS-REFERENCE TO RELATED APPLICATION

This application claims priority under 35 U.S.C. §119 to U.S. provisional patent application Ser. No. 60/586,792, entitled "SYSTEM AND METHOD FOR MODELING SHOPPING BEHAVIOR IN STORES WITH CENTER OF STORE AISLES," filed on Jul. 9, 2004, the entire disclosure of which is herein incorporated by reference.

TECHNICAL FIELD

The present invention relates to a system and method for modeling shopping behavior in stores.

BACKGROUND

A wide variety of goods are sold to consumers via a nearly limitless array of shopping environments. Manufacturers and retailers of these goods often desire to obtain accurate information concerning the customers' shopping habits and behavior, in order to more effectively market their products, and thereby increase sales.

Prior shopper information gathering techniques such as in-store intercept surveys have failed to provide an effective method for comparison of shopping data between stores. Applicant's own prior methods for producing normalized statistical data based on shopper path data obtained from a plurality of store environments are described in U.S. patent application Ser. No. 10/667,213, entitled SHOPPING ENVIRONMENT ANALYSIS SYSTEM AND METHOD WITH NORMALIZATION, filed on Sep. 19, 2003, the entire disclosure of which is herein incorporated by reference.

It would be desirable to provide an improved system and method for comparison of shopper behavior, which enables comparison of shopper behavior in similar behavioral domains in a plurality of retail environments.

SUMMARY

A system and method for modeling shopping behavior are provided. According to one aspect of the invention a shopping modeling system may be provided, which includes an analysis program executable on a computing device. The analysis program is typically configured to receive product position data and shopper path data gathered from a plurality of stores, each having a different shape represented in a corresponding store map. The analysis program is further typically configured to spatially define behavioral domains, product categories, and geographic locations that are common to each of the store maps, and compute statistics based on the product position data and the shopper path data, which statistics are normalized by behavioral domain, product category, and geographic location, across the plurality of stores.

According to another aspect, the method may include providing a store map for each of a plurality of stores, each having a different physical layout, identifying a set of behavioral domains, and spatially defining a plurality of the behavioral domains on each of the store maps. The method may further include receiving product position data and/or shopper path data for each of the plurality of stores, and computing a statistical measure of a shopping behavior for at least one of the behavioral domains, based on product position data and/or shopper path data from behavioral domains across the plurality of stores. The method may further include assigning relationships to each of the behavioral domains, which relate a shopping behavior to a position within the behavior domains; and computing at least one of an expected flow of shopper traffic and an expected purchase pattern based upon positions of the products and the behavioral domains. The method may further include spatially defining a plurality of product categories on the store map, and computing at least one of an expected flow of shopper traffic and an expected purchase pattern further may be based upon the product categories. The method may further include defining geographic sectors through the store map, and computing at least one of an expected flow of shopper traffic and an expected purchase pattern further may be based upon the geographic sectors.

According to a further aspect, the method may includes identifying a set of different types of behavioral domains representing areas of stores in which shoppers exhibit common shopping behaviors, identifying a set of different types of product categories representing areas of stores in which common products are sold, inputting a different store map for each of a plurality of stores into an analysis program executed on a computing device, defining spatial boundaries of a plurality of behavioral domains on each of the store maps, defining spatial boundaries of a plurality of product categories on each of the store maps, defining geographic sectors of the store on each of the store maps, inputting shopper path data and product position data from each of the stores into the analysis program, and computing statistical measures based on the shopper path data and product position data, normalized across the plurality of stores for at least one of the behavioral domains and/or product categories.

DETAILED DESCRIPTION OF THE PREFERRED EMBODIMENTS

Figure 1:
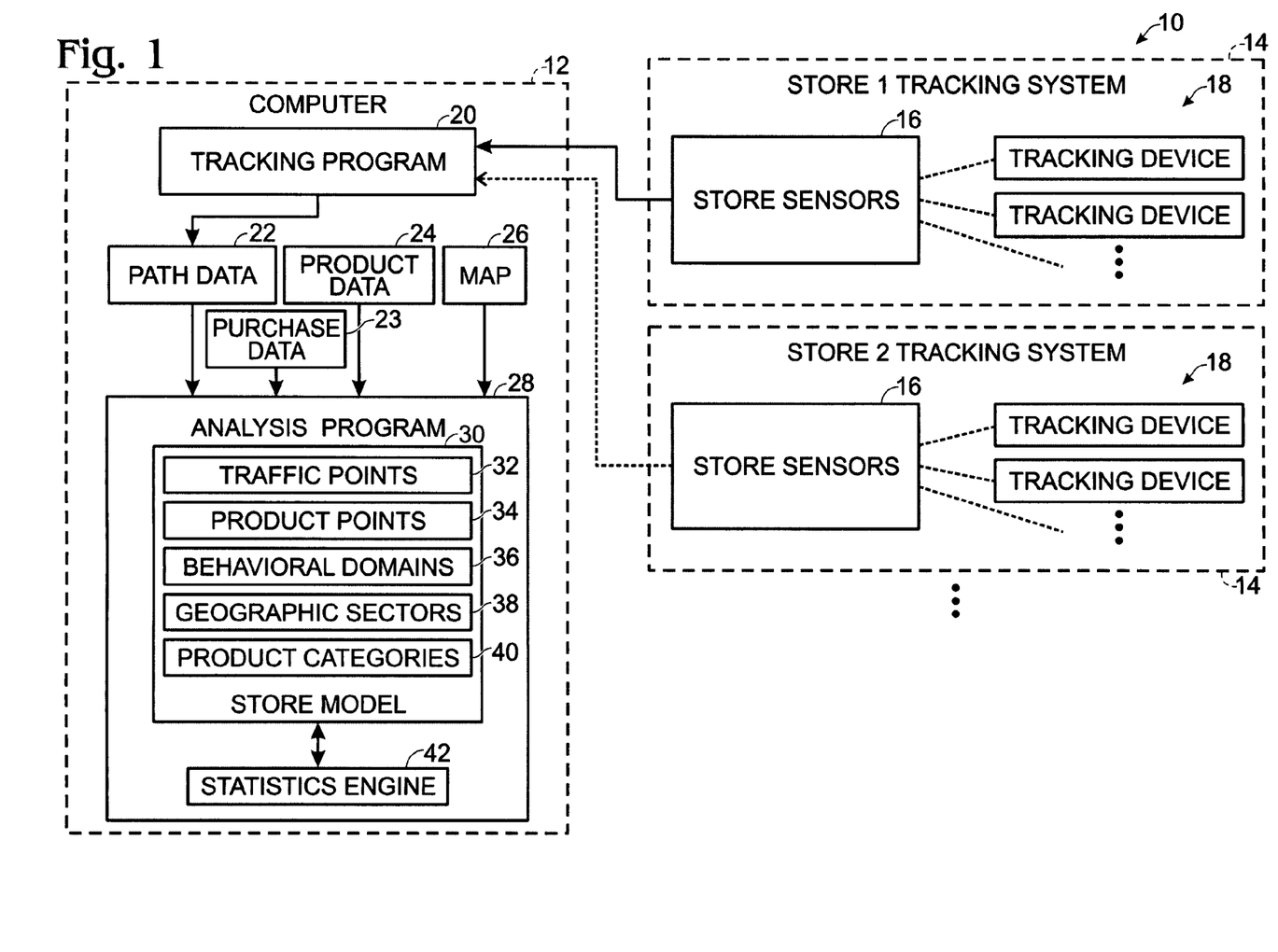
FIG. 1 is a schematic view of a system for modeling shopper behavior.

Referring to FIG. 1, a system for modeling shopper behavior is shown generally at 10. System 10 typically includes a computer 12 configured to receive data from one or more tracking systems 14 installed in a plurality of stores. Each tracking system 14 typically includes one or more store sensors 16 which are configured to receive signals from a plurality of tracking devices 18 carried by shoppers traveling throughout a store. In this way, the paths of the shoppers may be tracked within the store. Examples of suitable tracking technologies include infrared tracking systems, RFID tracking systems, etc., as described in co-pending U.S. patent application Ser. No. 10/115,186, entitled "PURCHASE SELECTION BEHAVIOR ANALYSIS SYSTEM AND METHOD," filed on Apr. 1, 2002, the disclosure of which is herein incorporated by reference. Alternatively video tracking systems may be used, as described in co-pending U.S. patent application Ser. No. 10/989,828, entitled "VIDEO SHOPPER TRACKING SYSTEM AND METHOD," filed Nov. 15, 2004, the disclosure of which is herein incorporated by reference.

Computer 12 typically includes memory, a processing unit configured to execute programs using portions of the memory, and a mass storage device for long term storage of programs and other data. Computer 12 is typically configured to execute a tracking program 20, which is configured to receive as input tracking data from tracking systems 14, and produce as output shopper path data 22, which is a representation of the paths traveled by a plurality of shoppers throughout the store.

Purchase data 23, product data 24, and map data 26 for each store are also configured to be received by and stored on computer 12. Purchase data 23 typically includes purchase records generated at checkout, each purchase record being linked to a specific shopper path and indicating the items purchased by the shopper traveling on the shopper path. Product data 24 typically represents the location or locations of each type of product within the store. Map data 26 typically is a computerized representation of the layout of the store, including a store perimeter, store entrances and exits, and store fixtures.

The path data 22, purchase data 23, product data 24, and map data 26 from the plurality of stores are taken as inputs into an analysis program 28. Analysis program 28 typically is configured to generate a store model 30, which is used to analyze and predict shopping behavior based on the path data 22, purchase data 23, product data 24, and map data 26 from the plurality of stores.

Within store model 30, shopper path data 22 is typically resolved to a plurality of traffic points 32, which may be arranged over the traversable areas of the store map. Similarly, the product data is typically resolved to a plurality of product points 34. The location of the product points thus is typically expressed in X and Y (lateral and longitudinal) coordinates, and may also include Z (vertical) coordinates. Traffic points and product points therefore serve as a grid or framework onto which the actual locations of shoppers and products may be resolved for analysis purposes. Traffic points and product points are discussed in further detail below with reference to FIG. 12.

As discussed in detail below, store model 30 is also configured to enable a user to identify behavioral domains 36, geographic domains 38, and product categories 40 for each store. A statistics engine 42 is provided, which is configured to perform a variety of statistical calculations for the purpose of statistical analysis of the path data, purchase data, product data across the behavioral domains, geographic sectors, and product categories.

For example, using statistics engine 42, analysis program 28 is typically configured to calculate the following measures for each store.

Visits—the percentage of trips that come within the vicinity (e.g., 6 ft) of a designated area.

Shops—the percentage of trips where the shopper slows up or stops within the vicinity, as evidence by a detected shopper speed falling below a predetermined threshold.

Purchases—the percentage of trips where a purchase of a product or product from a particular product category occurs, as evidenced by product purchase data obtained at the checkout.

Time—both the elapsed time for one or more of the above variables, as well as the point within their trip when the behavior occurs (percentile).

A number of measures can be derived from the measures listed above to focus on individual aspects of shopping behavior. For example, analysis program 28 may be configured to calculate "Buy Time," a term that is used herein to refer to the total amount of time that the shopper spends in the vicinity of an item that is ultimately purchased. Analysis program 28 may also be configured to calculate "Dwell Time," a term that is used to refer to the total time that all visitors spend in the vicinity of an item. It is possible also to construct a measure of the amount of time spent shopping the area, using the same predetermined threshold path speed criteria used for the shopping definition. This may be calculated for one shopper path, or for shoppers in the aggregate.

Another variable driving shopping behavior is the length of the shopper trip. Analysis program 28 is typically configured to measure both a time length and as a distance length for each shopper trip. Trip lengths times may be generally classified into the following categories.

0-3 minutes: Quick trip
3-10 minutes: Fill-in trip
10-20 minutes: Routine trip
20-120 minutes: Stock-up trip Trips longer than 120 minutes are generally eliminated as anomalies or likely methodological artifacts. Of course, the trip length classifications given above are merely illustrative, and variety of other predetermined trip length classifications may be used.

Analysis program 28 is typically configured to calculate statistics either based on trip length categories such as listed above, or based on the exact trip length for each trip. If interpolation between the four nominal lengths listed above is required, the true mean time for each classified time can be provided.

Figure 2:
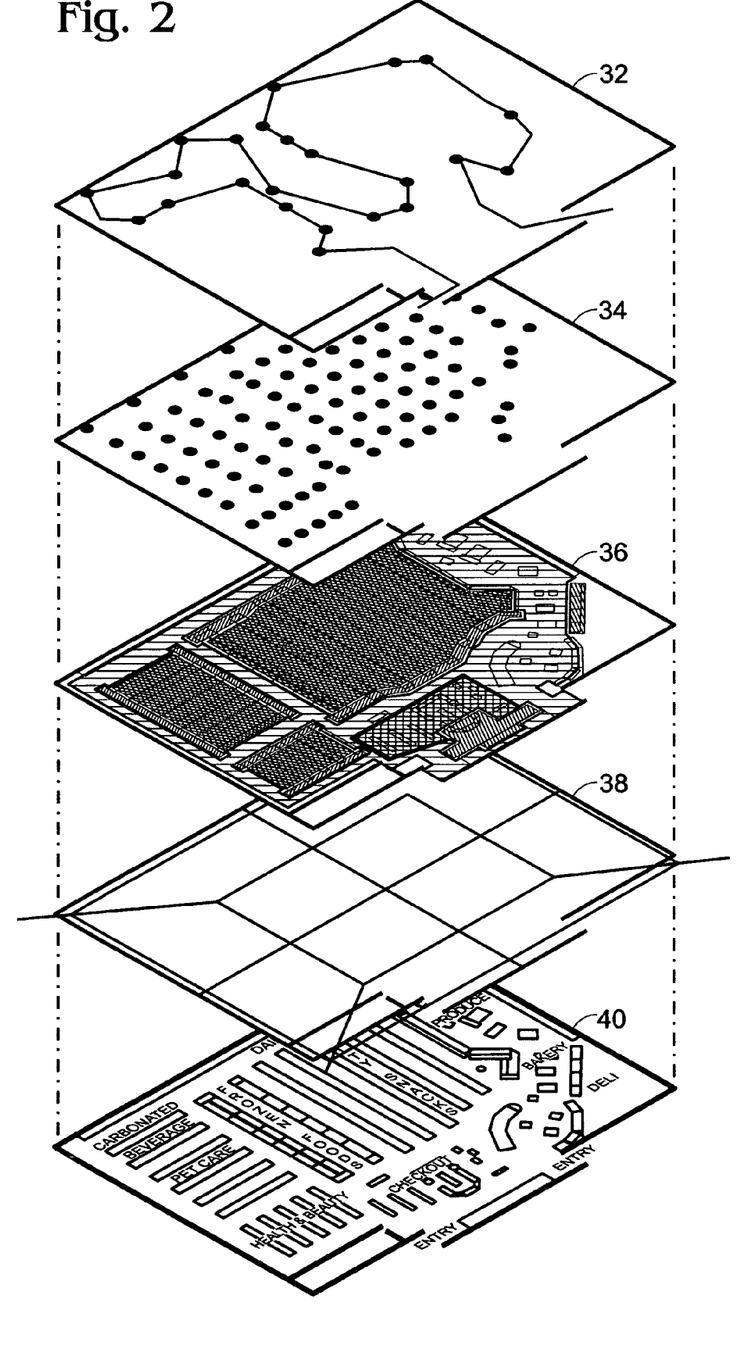
FIG. 2 is a schematic view of a layered data hierarchy employed by the system of FIG. 1.

FIG. 2 illustrates the information layers in store model 30, including traffic points 32, product points 34, behavioral domains 36, geographic sectors 38, and product categories 40. These individual layers are explained in detail below.

Figure 3:
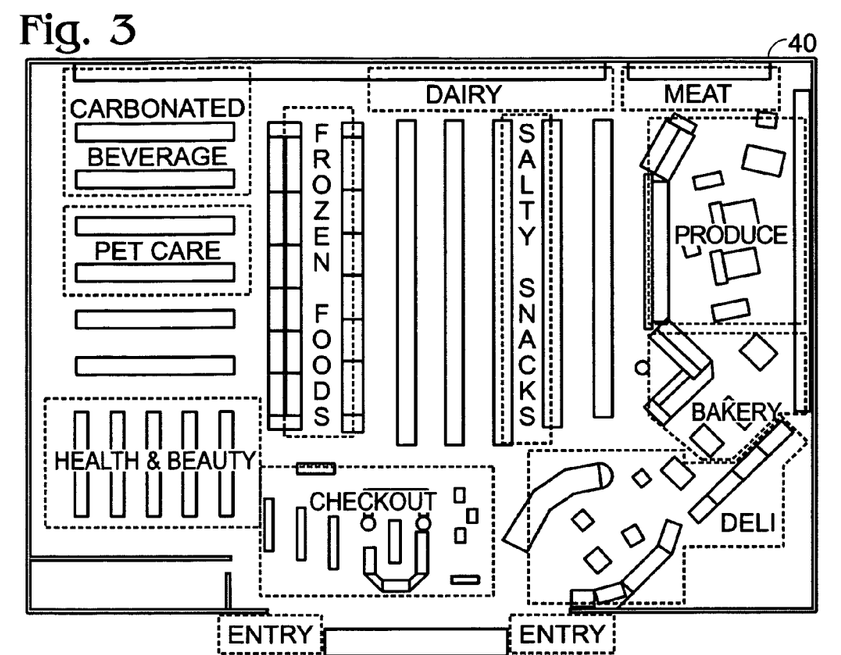
FIG. 3 is a schematic view of product categories overlaid on a store map utilized by the system of FIG. 1.

FIG. 3 illustrates an exemplary store map with product categories 40 overlaid thereon. The product categories are typically selected from a predefined list of product categories common to all stores being analyzed, and the geographic boundaries of the product category for each store are typically identified by an operator using the analysis program. Thus, the precise location of the meat department, for example, within each store may be identified by a computer operator. Typically, the product categories include frozen foods, salty snacks, dairy, meat, produce, bakery, deli, health and beauty, pet care, and carbonated beverage. Additional product categories may be added according to analysis requirements.

Figure 4:
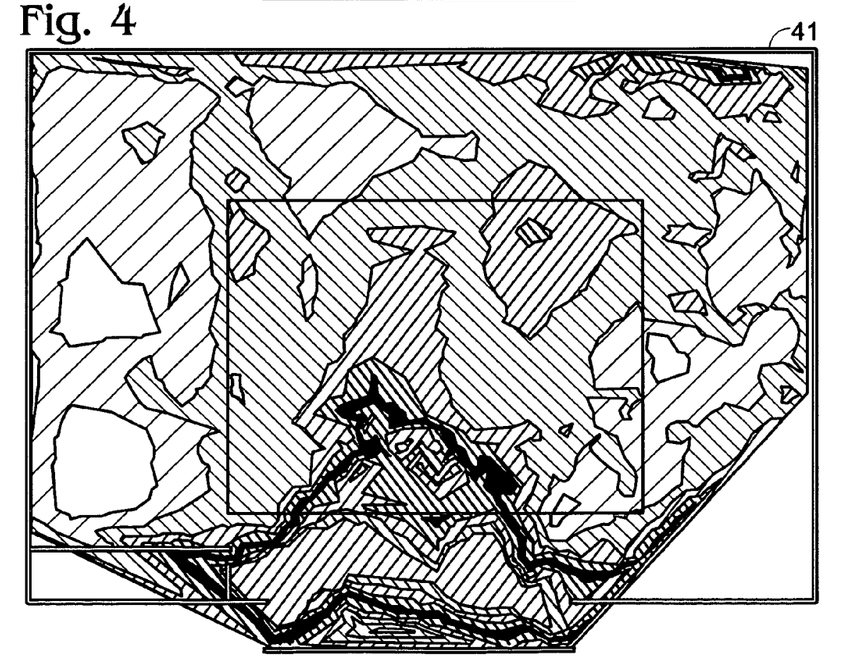
FIG. 4 is a schematic view of a density map produced by the system of FIG. 1.

FIG. 4 is a representation of shopper density within the store. Analysis program 28 is configured to calculate shopper density by examining path data 22 to determine the number of shopper paths that travel through areas of the store over time. Darker or more densely cross-hatched areas indicate areas of increased shopper density. Analysis program 28 may also be configured to produce maps illustrating various other measures, including visits, shops, purchases, shopper flow, buy times, dwell times, etc.

Figure 5:
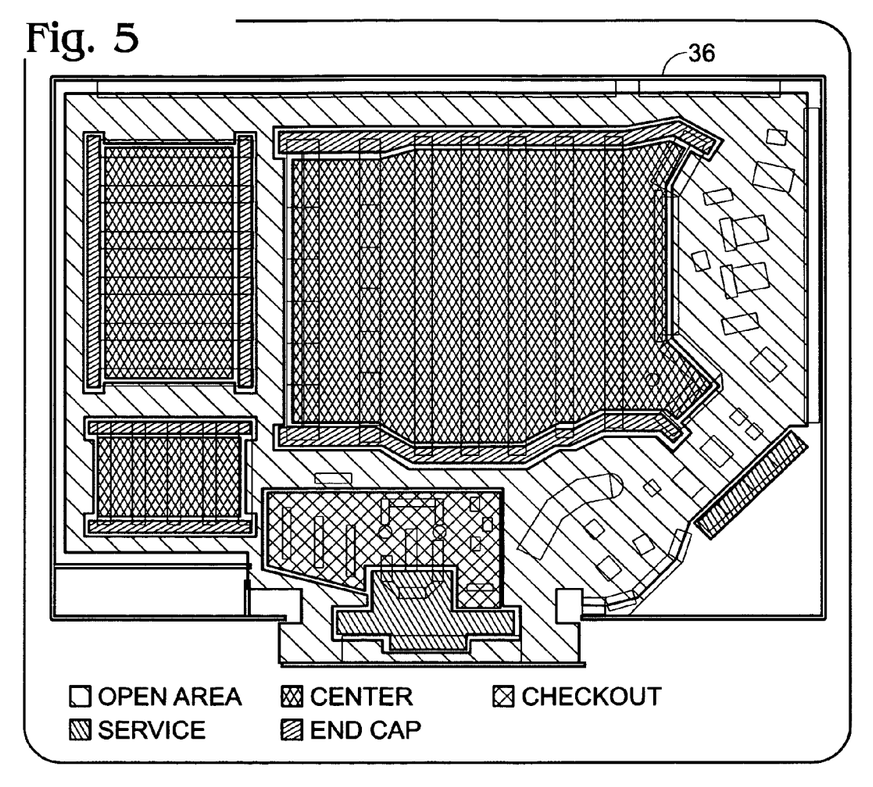
FIG. 5 is a schematic view of a behavioral domain map utilized by the system of FIG. 1.

FIG. 5 illustrates behavioral domains overlaid on a store map. Behavioral domains represent areas of the store in which shoppers exhibit common shopper behaviors. For example, at the checkout, shoppers commonly line up and pay for items. At a service counter such as a deli counter, shoppers usually place orders, and linger a while until the order is filled. In constrained aisles, shoppers have their travel options constrained along the length of the aisle.

Figure 7:
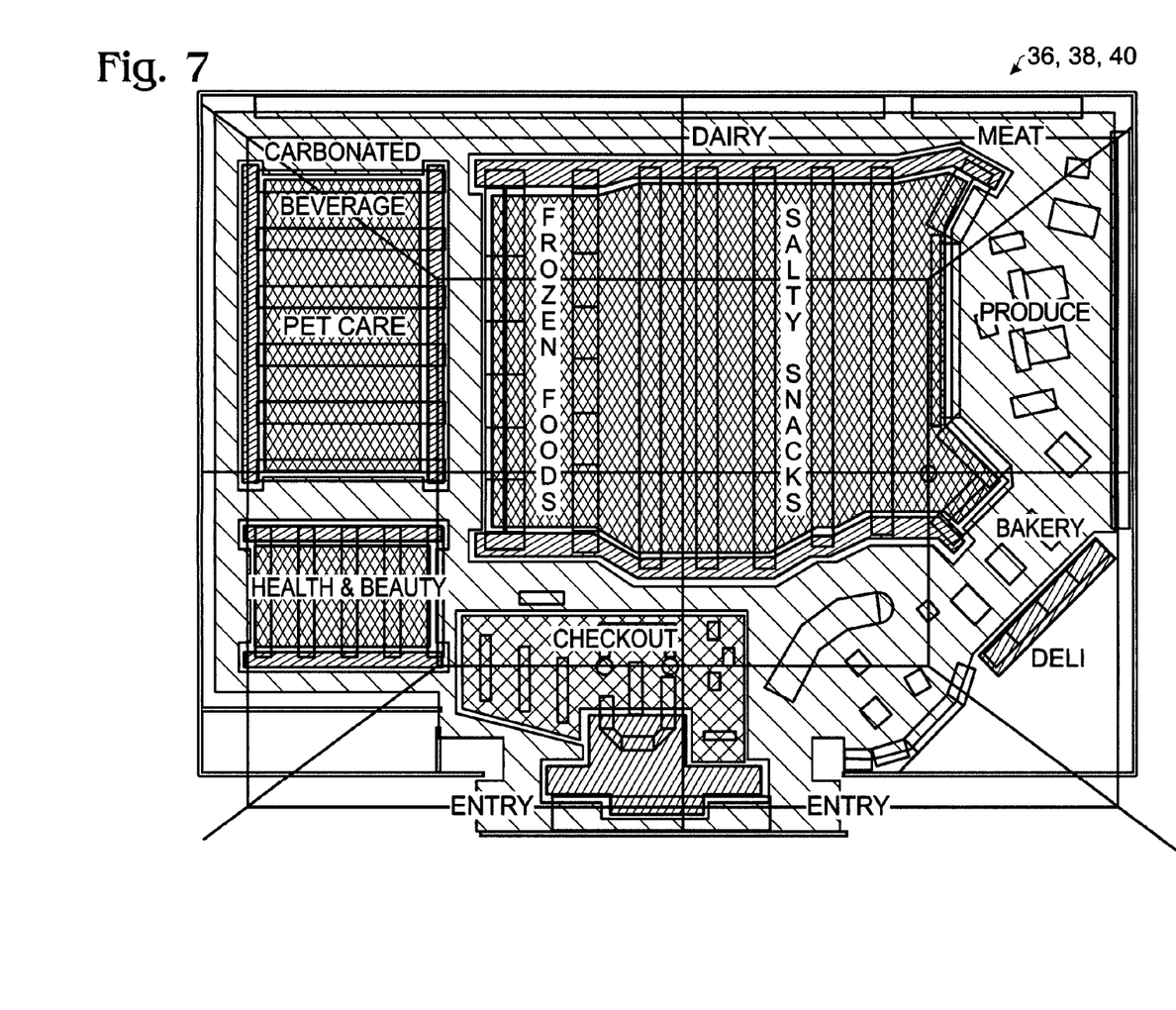
FIG. 7 is a schematic view of product categories, behavioral domains, and geographic sectors overlaid on a store map.
Figure 8:
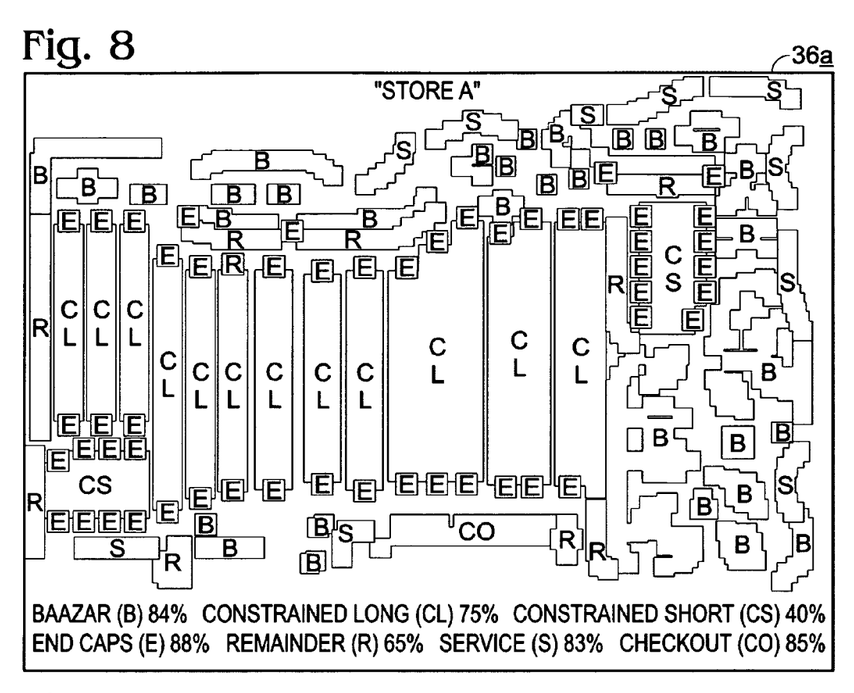
FIG. 8 is a schematic view of a behavioral domain map for a first store utilized by the system of FIG. 1.

The behavioral domains are typically selected from a list of pre-identified domains. One possible list of behavioral domains is shown in FIG. 5, and includes open areas (also referred to as "bazaars"), service counters, center of store aisles, end caps, and checkout domains. As shown in FIGS. 7 and 8 discussed below, another possible list of behavioral domains includes bazaars, constrained long aisles, constrained short aisles, end caps, remainder, service counters, and checkout domains. Other possible domains include a racetrack domain that wraps around inside of perimeter of store, a serpentine domain that is a constrained, non-straight path, and a remainder domain that encompass areas of the store that have not been assigned to other domains.

With regard to the racetrack domain, it has been demonstrated that shopper traffic travels generally counterclockwise on a peripheral racetrack aisle surrounding most stores. Therefore, the following areas of the racetrack domain may be defined.

Ascension—portion of racetrack on which shoppers move from the front of the store to the back.
Rear Transverse—across the back of the store, typically between the rear end caps and the perimeter wall.
Descension—typically the final or dominant path by which a shopper may return to the front of the store.
Front Transverse—across the front of the store, typically between the front end caps and the checkouts or service areas.

With regard to center of store aisle domains, these are typically domains that have a constrained, straight path. Center of store aisles may be categorized by type, as follows.

Long constrained walled aisles (typically 50 ft. in length; visual isolation from adjacent aisles)
Broken/walled aisles (transverse aisle intersects series of aisles)
Shorter constrained walled aisles (less than 50 ft. in length)
"Stub" walls (no visual isolation on right, left or both) (e.g. small walls, and waist high freezer units)
Wide aisles (greater than seven foot t aisle widths)
Freezer doors
"Bazaar" type open areas and widened aisle (e.g. produce/ other non-forced paths with tables not blocking the view)
Extra-wide aisles
Others—for example, shorter versions of stub walls, wide aisles, etc.

End cap domains are typically defined as a region encompassed by predetermined radius, such as 6 ft., from an actual end cap display unit. Further, the checkout domain is typically defined as a region bounded by a radius of a predetermined distance, such as 6 ft., from the entry to a checkout lane. Bazaar domains are typically characterized by lower displays that do not force shoppers along constrained paths, and do not block shopper's view, such as is typically in produce departments. Service domains are areas where shoppers place orders and wait for service from store staff, such as the deli or meat department.

Figure 6:
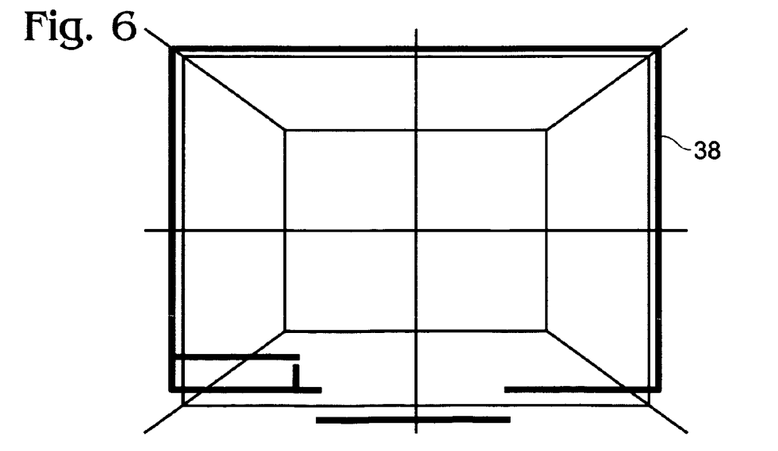
FIG. 6 is a schematic view of a geographic sector map utilized by the system of FIG. 1.

FIG. 6 illustrates a map of geographic sectors that may be applied to a substantially rectangular (or square) store map. The aspect ratio of the geographic sector map may be stretched as desired to fit store maps of various sizes. It will be appreciated that in addition to sectors, a coordinate system may be used for normalizing the store size. For example, the left bottom corner of the store may be 0,0 and the right topmost corner of the store may be set to 1,1, and intermediate positions represented as decimals.

FIG. 7 illustrates a store map superimposed with the product categories of FIG. 3 (shown without dotted lines for clarity), the behavioral domains of FIG. 5, and the geographic sectors of FIG. 6. With these three levels of normalization, shopper path data and product purchase data may be compared across a plurality of stores for specific geographic locations, specific behavioral domains, and specific product categories. For, example, the dwell time for shoppers may be analyzed for salty snacks categories appearing in the front right corner of stores, within a deli counter domain.

Figure 9:
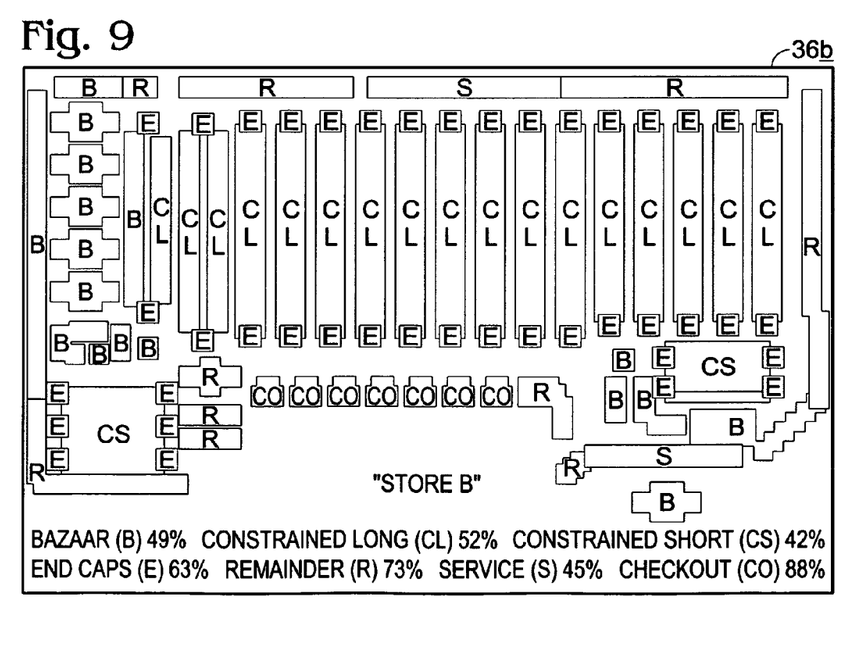
FIG. 9 is a schematic view of a behavioral domain map for a second store map utilized by the system of FIG. 1.
Figure 10:
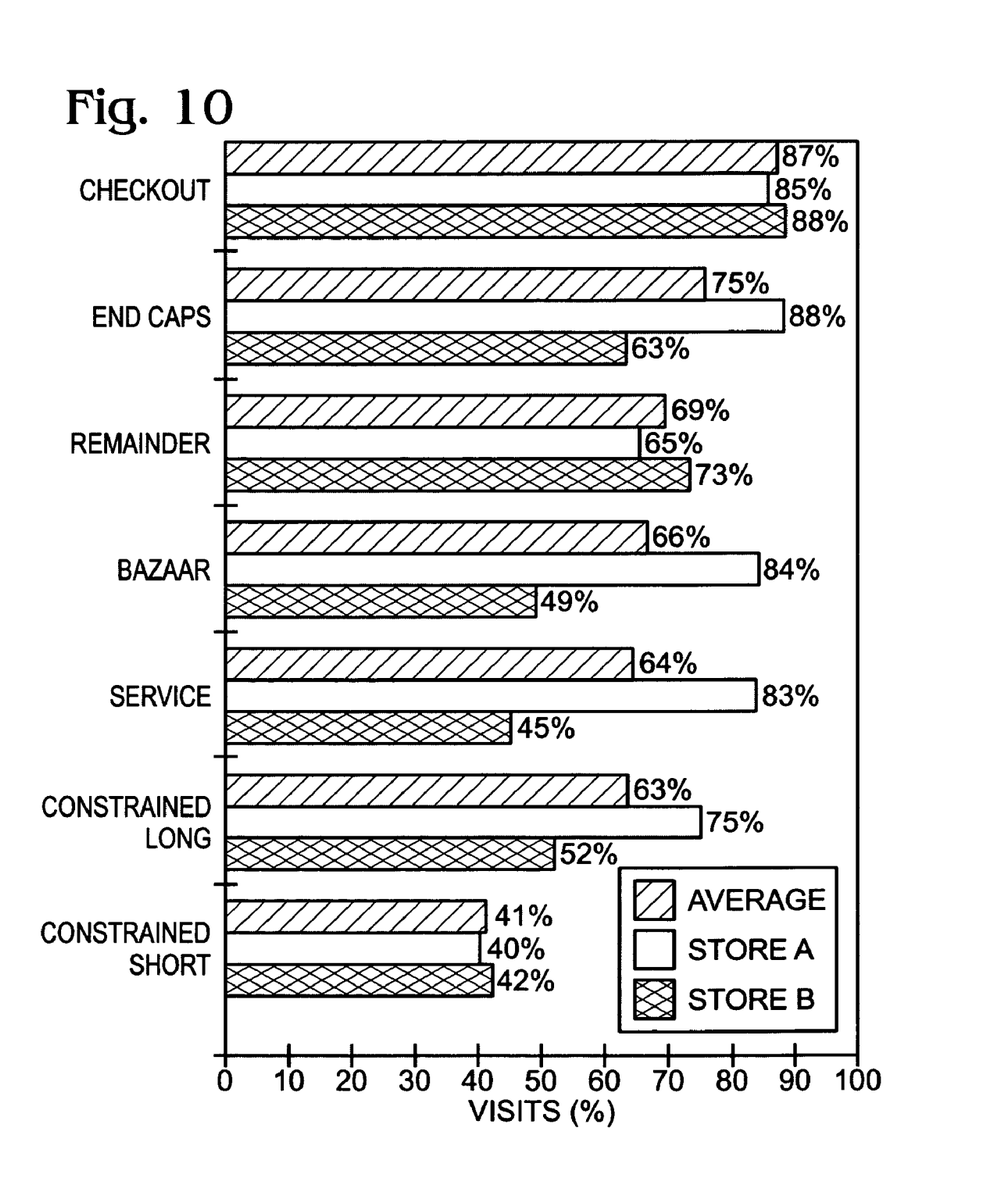
FIG. 10 is a bar graph illustrating a percentage of shopper visits to specified behavioral domains.

FIGS. 8 and 9 illustrate behavioral domain maps for a first and second store (Store A and Store B), each having a different physical layout. For these stores, the set of behavioral domains includes bazaar (B), constrained long aisles (CL), constrained short aisles (CS), end caps (E), remainder (R), service counters (S), and checkout (CO) domains. The spatial locations of the various domains have been indicated on each of the store maps. While the locations of the domains differs in each store, as discussed above, analysis program 28 may be utilized to calculate statistical measures for each behavioral domain across the plurality of stores, such as the visits, shops, purchases, time and other measures discussed above. FIG. 10 is a bar graph illustrating an exemplary measure, namely, the percentage of shoppers at Store A and Store B who visit each of the domains shown in FIGS. 7-8, as well as an average percentage of visits across a plurality of stores.

Figure 11:
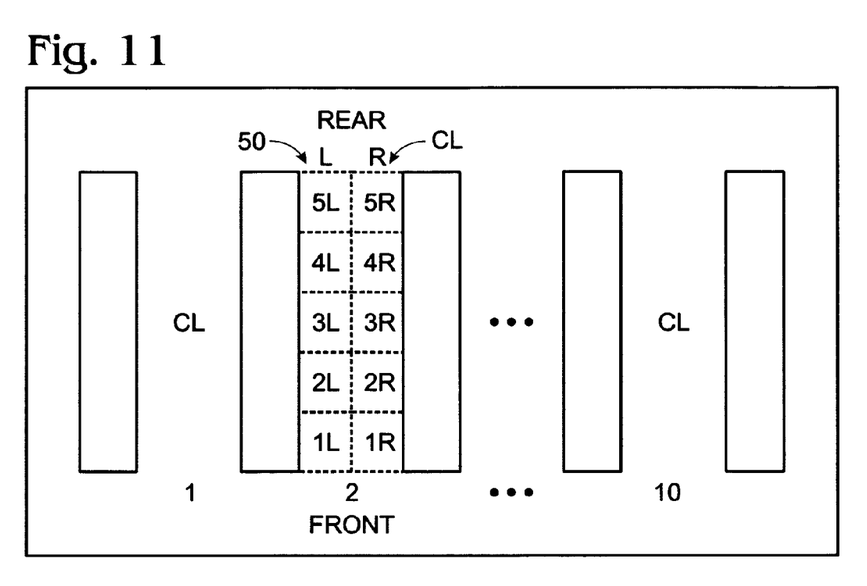
FIG. 11 is a schematic view of center of store aisle domains and sub-domains of the system of FIG. 1.

As shown in FIG. 11, each of the domains may be divided into sub-domains. For example, the center of store aisle domain is typically fractionated by segment according to a normalized aisle depth. Specifically, each constrained long center of store aisle (CL) may be divided into a plurality of sub-domains along its width and length. Typically, each constrained long aisle is divided into five or six equally sized sub-domains 50 on each of the left and right side of the aisle (five sub-domains are depicted). These sub-domains are numbered 1L-5L and 1R-5R, increasing in number toward the rear of the store. Alternatively, other subdivisions may be used.

In addition, the relative left to right position of each center of store aisle domain is typically indicated by an index aisle number. Typically this is accomplished by numbering the center of store aisles in increasing order from left to right, although suitable numbering systems may alternatively be adopted. It will be appreciated that this index aisle number may be normalized, for example, by assigning a value of 1 to the leftmost aisle and 10 to the rightmost aisle, and assigning fractional values (4.5, 5.5, etc.) representing the relative right or left position of the internal center of store aisles.

The flow of traffic around the perimeter of the store (racetrack) influences the flow of traffic in center of store aisles.

For example, the nearer a center of store aisle is to the right side of the store, the earlier it will be visited in the typical shopper trip. The trip decile (or percentile completion of a shopper trip) during which a center of store is visited increases regularly from right to left. Since Buy Times steadily decrease with increasing trip decile, any prediction of Buy Time must be predicated on the location of the aisle. Thus, one potential advantage of a normalized index aisle number is in computing expected trip deciles or Buy Times for a product point located along a center of store aisle.

Figure 12:
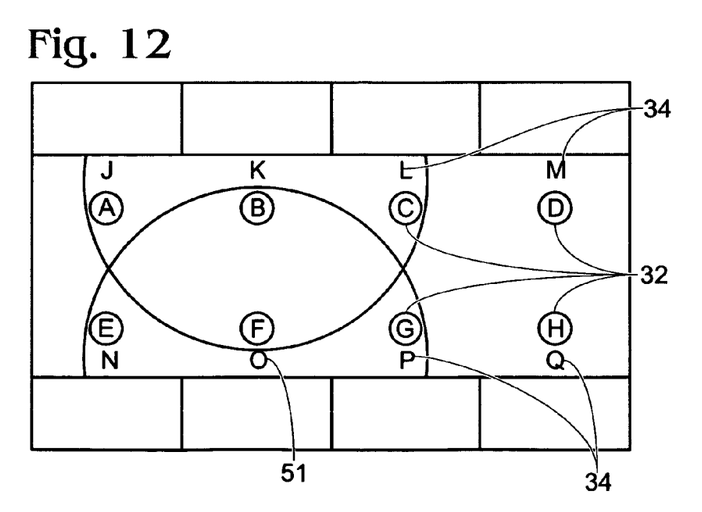
FIG. 12 is a schematic view of traffic points and product points of the system of FIG. 1.

FIG. 12 illustrates in detail both traffic points and product points within a center of store aisle. In many stores such as grocery stores, each aisle is bounded on either side by a series of product displays, typically between about 4 ft wide and 6 ft high. In general, each of these displays constitutes one product point. A typical constrained long aisle (CL) approximately 60 feet in length will have 3 product points per aisle sub-domain 50. For computational purposes each product point is defined by x,y coordinates of the point on the floor at the center of the display. At a minimum, the location of every Stock Keeping Unit (SKU) in the store is defined by its product point. If detailed planograms are available, the exact x,y,z coordinates of the product (including its height from the floor) can be used. The principle benefit of this detail is the analysis of the height of products purchased, cross tabulated with any other variables in the system.

Figure 15:
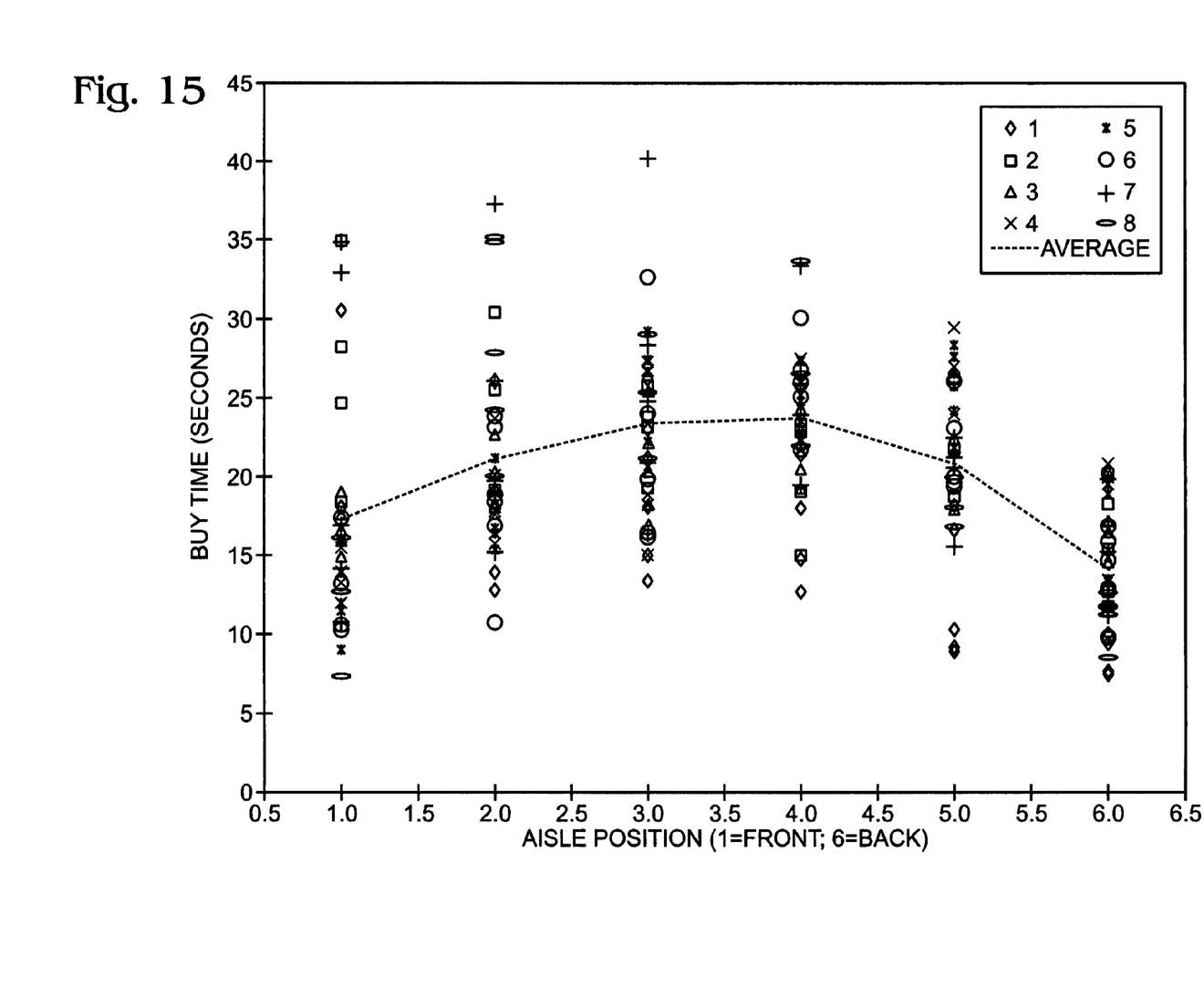
FIG. 15 is a graph illustrating a relationship between buy times and aisle position for a plurality of center of store aisles.

In addition to the computation of statistical measures across product category, behavioral domain, and geographic sector, analysis program 28 is also configured to assign relationships to each of the behavioral domains, geographic sectors, and/or product categories, which relate a shopping behavior to a position within the behavioral domains, geographic sectors, and/or product categories. FIG. 15 shows one example relationship between a behavioral domain and a shopping behavior, namely, the relationship between Buy Time and shopper position (aisle depth) within each of several center of store aisles numbered 1-8. The graph shows the distribution of Buy Times among each of the center of store aisles, as well as an average measured across all aisles.

The following table illustrates another exemplary relationship between a shopping behavior and a position in a product category. The table shows the relationship between visits, visit-to-shop conversion, shops, and shop-to-purchase conversions for the "Bread" product category across a plurality of stores.

| Product Category: Bread | Store-1 | Store-2 | Store-3 | Store-5 | Mean | StdDev |
|---|---|---|---|---|---|---|
| Visits | 82% | 50% | 44% | 73% | 62.2% | 18.2% |
| Visits To Shops | 70% | 61% | 69% | 68% | 67.2% | 4.0% |
| Shops | 57% | 30% | 31% | 50% | 42.1% | 13.7% |
| Shops to Purchases | 29% | 76% | 93% | 54% | 63.1% | 27.7% |
| Purchases | 13% | 14% | 19% | 11% | 14.3% | 3.5% |

Using average relationships such as those described above as norms, analysis program 28 is typically configured to compute predicted shopper behavior, such as an expected shopper flow and or expected purchasing patterns, based upon positions of the products and the behavioral domains within a specific store.

Figure 13:
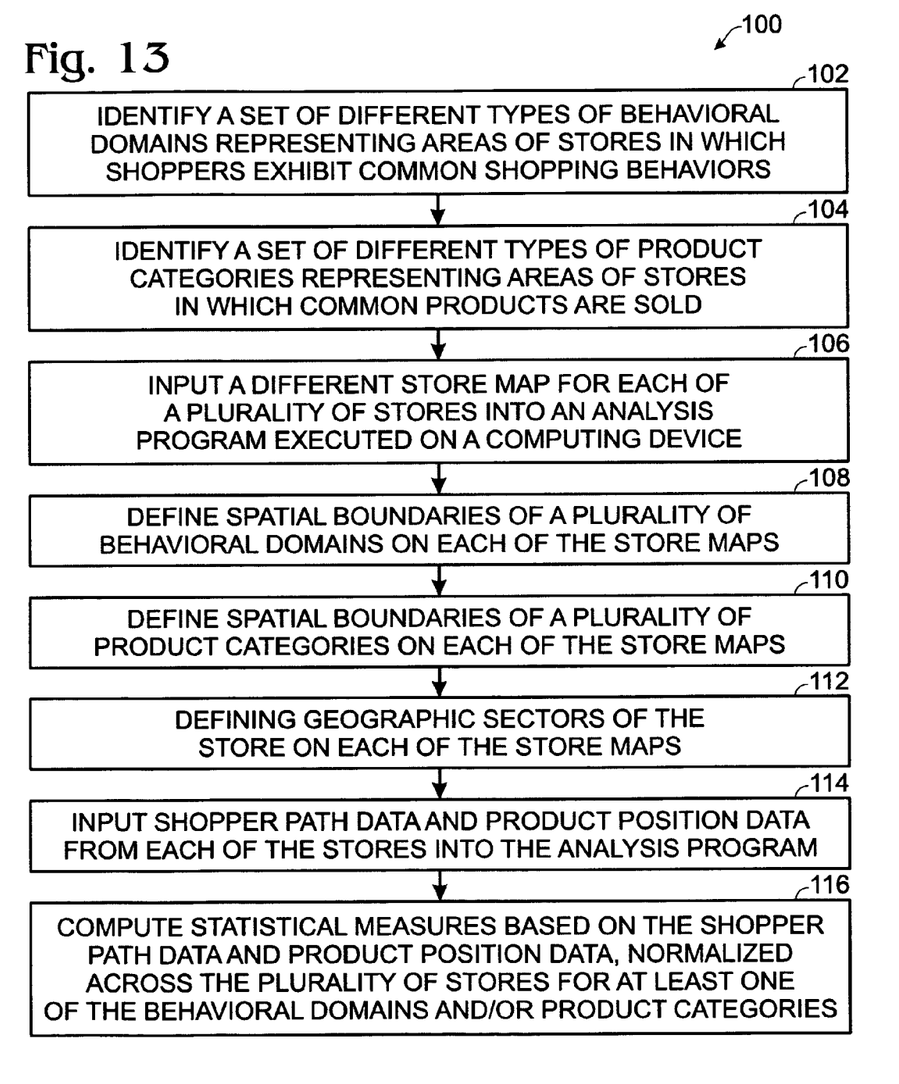
FIG. 13 is a flowchart illustrating a method for modeling shopper behavior according to one embodiment of the present invention.

FIG. 13 illustrates a method 100 according to one embodiment of the invention. Method 100 generally includes, at 102, identifying a set of different types of behavioral domains representing areas of stores in which shoppers exhibit common shopping behaviors. Exemplary behavioral domains are discussed above and illustrated in FIGS. 5, 7, and 8. At, 104, the method generally includes identifying a set of different types of product categories representing areas of stores in which common products are sold. Exemplary product categories are discussed above and illustrated in FIG. 3.

At 106, the method typically includes inputting a different store map for each of a plurality of stores into an analysis program executed on a computing device. At 108, the method typically includes defining spatial boundaries of a plurality of behavioral domains on each of the store maps, as discussed above and shown in FIGS. 5, 7, and 8. At 110, the method typically includes defining spatial boundaries of a plurality of product categories on each of the store maps, as discussed above and shown in FIG. 3. At 112, the method typically includes defining geographic sectors of the store on each of the store maps, as discussed above and shown in FIG. 6. At 114, the method typically includes inputting shopper path data and product position data from each of the stores into the analysis program. And, at 116, the method typically includes computing statistical measures based on the shopper path data and product position data, normalized across the plurality of stores for at least one of the behavioral domains and/or product categories. Examples of such statistical measures are illustrated in FIG. 10.

Figure 14:
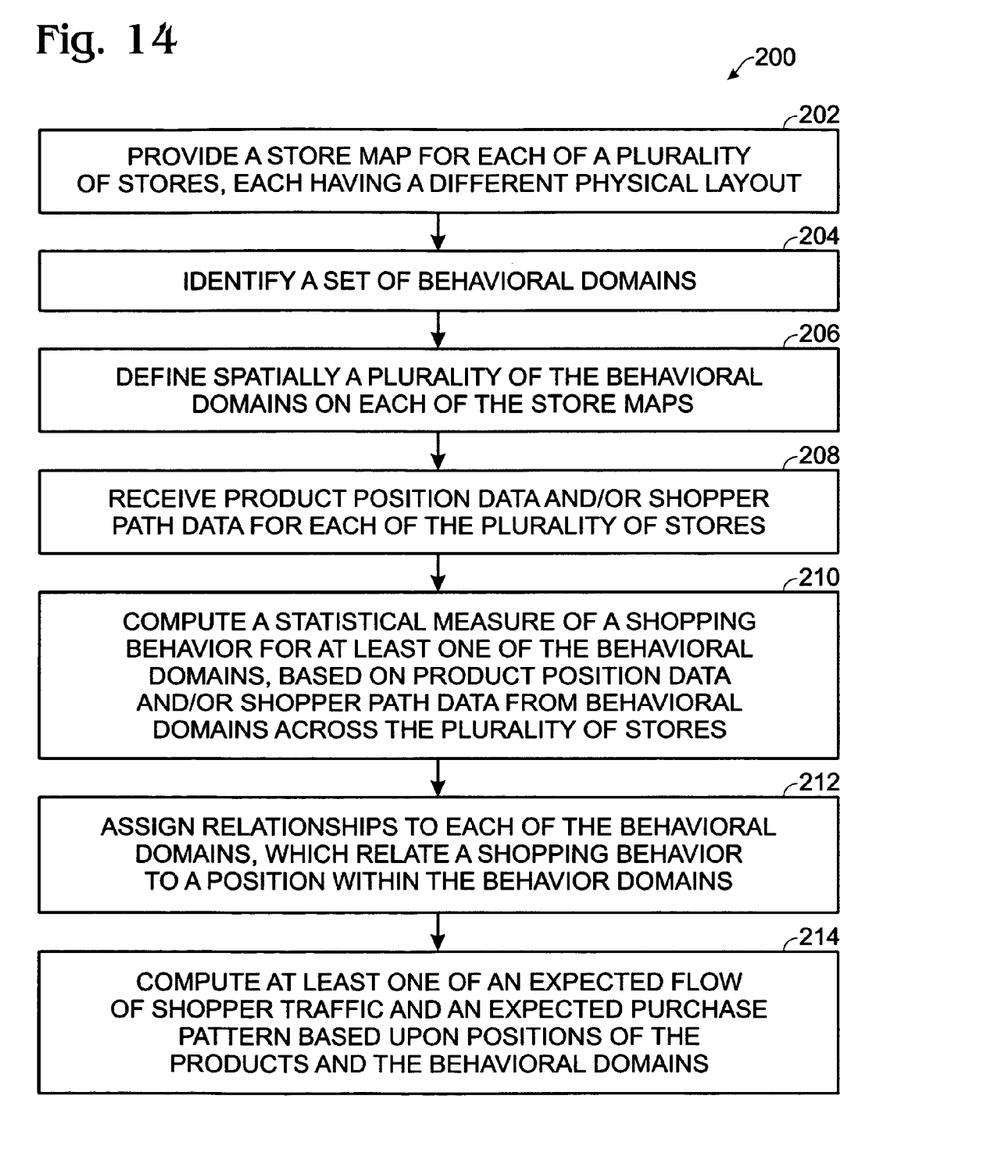
FIG. 14 is a flowchart illustrating a method for modeling shopper behavior according to another embodiment of the present invention.

FIG. 14 illustrates a method 200 according to another embodiment of the invention. At 202, the method includes providing a store map for each of a plurality of stores, each having a different physical layout. At 204, the method includes identifying a set of behavioral domains, as discussed above. At 206, the method includes spatially defining a plurality of the behavioral domains on each of the store maps, as illustrated in FIGS. 5, 7, and 8. At 208, the method includes receiving product position data and/or shopper path data for each of the plurality of stores. At 210, the method includes computing a statistical measure of a shopping behavior for at least one of the behavioral domains, based on product position data and/or shopper path data from behavioral domains across the plurality of stores. An example of such a statistical measure is illustrated in FIG. 10. As shown at 212, the method may further include assigning relationships to each of the behavioral domains, which relate a shopping behavior to a position within the behavior domains. An example of such a relationship is shown in FIG. 15. At 214, the method may further include, computing at least one of an expected flow of shopper traffic and an expected purchase pattern based upon positions of the products and the behavioral domains.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

The invention claimed is:
1. A shopping modeling system, comprising:
a computing device including a processing unit; and
an analysis program executable via the processing unit of the computing device, the analysis program configured to:
receive product position data and shopper path data of shoppers gathered from a plurality of stores, each of the plurality of stores having a different shape represented in a corresponding store map;
generate a store model for each store, the store model for a corresponding store including:
a traffic points layer comprising traffic points that resolve shopper path data, each point of the traffic points indicating a relative frequency and/or length of shopper visits within a predefined vicinity of a location;

a product points layer comprising product points that resolve product position data, each point of the product points indicating a particular location of one of a plurality of products in the corresponding store;

a geographic sector layer comprising spatially defined geographic locations defined by a geographic sector map, an aspect ratio of the geographic sector map adjusted to fit the corresponding store map, the geographic sector map configured to divide each store map of the plurality of store maps into a same number of geographic sectors;

a product category layer comprising spatially defined product categories; and a behavioral domain layer comprising spatially defined behavioral domains representing areas of the corresponding store in which the shoppers exhibit common shopper behaviors, the spatially defined behavioral domains selected from a group consisting of bazaar, service area, center of store aisle, end cap, and checkout;

compute using the store model for each store statistics for the shoppers comprising shopper visits, shops, purchases, buy time, and trip decile statistics based on the product position data and the shopper path data;

normalize said statistics by each behavioral domain defined by the behavior domain layer, each product category defined by the product category layer, and each geographic location defined by the geographic sector layer, across the plurality of stores; and calculate an expected shopper flow and expected product purchases for a selected location within the corresponding store, based on the normalized statistics.

2. The system of claim 1, wherein the geographic locations are computed by geographic sectors normalized to each of the store maps.

3. The system of claim 1, wherein the geographic locations are computed by a coordinate system normalized to each of the store maps.

4. The system of claim 1, wherein center of store aisles are fractionated by segment according to a normalized aisle depth.

5. The system of claim 4, wherein the center of store aisles are numbered with a normalized aisle index number to indicate relative left to right position in the store.

6. The system of claim 5, wherein the analysis program is configured to receive a store number, normalized index aisle number, segment number, product point number, and product category as inputs for each product point; and wherein the analysis program is configured to calculate shopper visits, shops, purchases, buy time, and trip decile as outputs for each product point, based on the inputs.

7. The system of claim 1, wherein the product categories are selected from the group consisting of frozen foods, salty snacks, dairy, meat, produce, bakery, deli, health and beauty, pet care, and carbonated beverage.

8. A computer-executed shopping analysis method, comprising:

at an analysis program executed on a processing unit of a computing device:

receiving product position data and shopper path data of shoppers gathered from a plurality of stores, each of the plurality of stores having a different shape represented in a corresponding store map;

generating a store model for each store, the store model for a corresponding store including:

a traffic points layer comprising traffic points that resolve shopper path data, each point of the traffic points indicating a relative frequency and length of shopper visits within a predefined vicinity of a location;

a product points layer comprising product points that resolve product position data, each point of the product points indicating a particular location of one of a plurality of products in the corresponding store;

a geographic sector layer comprising spatially defined geographic locations defined by a geographic sector map, an aspect ratio of the geographic sector map adjusted to fit the corresponding store map, the geographic sector map configured to divide each store map of the plurality of store maps into a same number of geographic sectors;

a product category layer comprising spatially defined product categories; and a behavioral domain layer comprising spatially defined behavioral domains representing areas of the corresponding store in which the shoppers exhibit common shopper behaviors, the spatially defined behavioral domains selected from a group consisting of bazaar, service area, center of store aisle, end cap, and checkout;

computing using the store model for each store statistics for the shoppers comprising shopper visits, shops, purchases, buy time, and trip decile statistics based on the product position data and the shopper path data;

normalizing said statistics by each behavioral domain defined by the behavior domain layer, each product category defined by the product category layer, and each geographic location defined by the geographic sector layer, across the plurality of stores; and calculating an expected shopper flow and expected product purchases for a selected location within the corresponding store, based on the normalized statistics.

9. The method of claim 8, wherein the geographic locations are computed by geographic sectors normalized to each of the store maps.

10. The method of claim 8, wherein the geographic locations are computed by a coordinate system normalized to each of the store maps.

11. The system of claim 8, wherein center of store aisles are fractionated by segment according to a normalized aisle depth.

12. The method of claim 11, wherein the center of store aisles are numbered with a normalized aisle index number to indicate relative left to right position in the store.

13. The method of claim 12, further comprising, at the analysis program, receiving a store number, normalized index aisle number, segment number, product point number, and product category as inputs for each product point; and calculating shopper visits, shops, purchases, buy time, and trip decile as outputs for each product point, based on the inputs.

14. The method of claim 8, wherein the product categories are selected from the group consisting of frozen foods, salty snacks, dairy, meat, produce, bakery, deli, health and beauty, pet care, and carbonated beverage.

* * * * *